May 7, 1963  O. M. MARTINSON  3,088,605
PARKING SYSTEM FOR AUTOMOBILES
Filed July 30, 1956  11 Sheets-Sheet 3

May 7, 1963  O. M. MARTINSON  3,088,605
PARKING SYSTEM FOR AUTOMOBILES
Filed July 30, 1956  11 Sheets-Sheet 10

United States Patent Office 3,088,605
Patented May 7, 1963

3,088,605
PARKING SYSTEM FOR AUTOMOBILES
Oscar M. Martinson, 530 W. 236th St., Riverdale, N.Y.
Filed July 30, 1956, Ser. No. 601,088
6 Claims. (Cl. 214—16.1)

This invention relates generally to the field of devices employed for mechanically parking automobiles, and more particularly to an improved system for the parking of automobiles within multi-story buildings in a substantially automatic manner.

Such devices are not entirely unknown in the prior art, and the invention relates to specific improvements over the prior art offering advantages from the standpoint of space utilization, the number of personnel required to operate the system and the speed with which cars are parked and made ready for operation.

It is among the principal objects of the present invention to provide an improved parking system of the class described which is adapted for use in conjunction with storage buildings having a relatively narrow frontage with considerable depth conforming to narrow lots commonly found in the central areas of large cities.

Another object of the invention lies in the provision of an improved parking system by the use of which a single attendant may assign an unlimited number of cars to individual parking stalls, the vehicles being transported to the designated stalls and removed therefrom when required by the automatic operation of a combined elevator and movable carriage.

Still another object of the invention lies in the provision of improved double deck elevator car construction capable of parking a plurality of cars and readying a second plurality of cars in substantially a single operation.

A further object of the invention lies in the provision of an improved parking system for automobiles possessed of the above enumerated advantages, in which the cost of fabrication and erection may be of a reasonably low order, with consequent wide sale and use.

A feature of the invention lies in the complete absence of electronic or vacuum tube circuits in the control thereof, thereby assuring great reliability and infrequent necessity of servicing.

Another feature of the invention lies in the utilization of building lots which may be as much as five times as deep as wide, it being possible to construct a building for use in conjunction with the parking system which is as little as ten feet wide.

These objects and features, as well and other incidental ends and advantages, will become more clearly apparent during the course of the following disclosure, and be pointed out in the appended claims.

On the drawings, to which reference will be made in the specification, similar reference characters have been employed to designate corresponding parts throughout the several views.

Before entering into a detailed consideration of the invention, a description of the function of the same will be made at this point in the disclosure with a view toward facilitating discussion of the structural aspects thereof.

The parking system is used in conjunction with a multi-story building of a depth of approximately 100 feet, and a width of any desired multiple of 10 feet. Thus the building may have dimensions, for example, of 10 feet by 100 feet, 20 feet by 100 feet, 30 by 100 feet, etc. This permits the parking of a row of vehicles for each 10 foot width by a single elevator which travels in a vertical direction midway between the front and rear walls of the building. Allowing a length of approximately 20 feet per vehicle, it is possible to park 2 automobiles forwardly of the elevator shaft and an additional 2 vehicles rearwardly of the elevator shaft on each floor of the building. At the ground floor, two vehicles may be parked rearwardly of the elevator shaft or the building may be so designed as to have an entrance for incoming vehicles at the front of the building and a second entrance at the rear for departing vehicles. The elevator shaft extends below the ground floor level to permit loading on an upper or lower deck of the elevator car. Incoming vehicles are driven to be positioned upon a 40 foot entrance runway within the confines of the building, subsequent movement being accomplished by transfer means described hereinbelow. An attendant assigns each incoming car to anyone of four stalls on each floor of the building, depending upon previous occupancy or availability. The cars are moved singly or two at a time to the designated stalls by the pressing of buttons upon a control panel, following which the cars are transported to one of the decks on the elevator car by a movable carriage which engages the same, and raised to the appropriate floor. The cars are then moved by the same means to the designated stall forwardly or rearwardly of the elevator shaft which means then returns to the deck of the elevator prior to the elevator returning to the ground floor. Where cars are selected for return to the ground floor, the elevator will then travel to the appropriate floor and pick up the desired car prior to descending to the ground floor. Two cars may be selected for readying at the same time, the same being picked up in succession. Where one of the cars desired is parked behind an undesired car, the nearer car will be loaded upon one deck of the elevator, the elevator moved to align an unoccupied deck with the same floor, following which the desired car is loaded upon the second deck, the elevator returned to position the first deck opposite the floor, following which the unwanted vehicle is returned to the position originally occupied by the desired vehicle. Owing to the fact that both decks of the elevator car are required in this operation, if two vehicles are desired at the same time, it is necessary that this special condition be first accomplished before the second vehicle is picked up prior to the return of the elevator car to the ground floor. Upon arriving at the ground floor, the two decks of the elevator car are successively aligned therewith for discharging the vehicles thereon.

During continuous operation, parked cars will be transferred from the position in which they were originally placed, and the movement of the vehicles is automatically accounted for by memory circuits so that it is necessary only to select the vehicle by its initial stall designation to assure the return of the same vehicle.

Figure 11A:
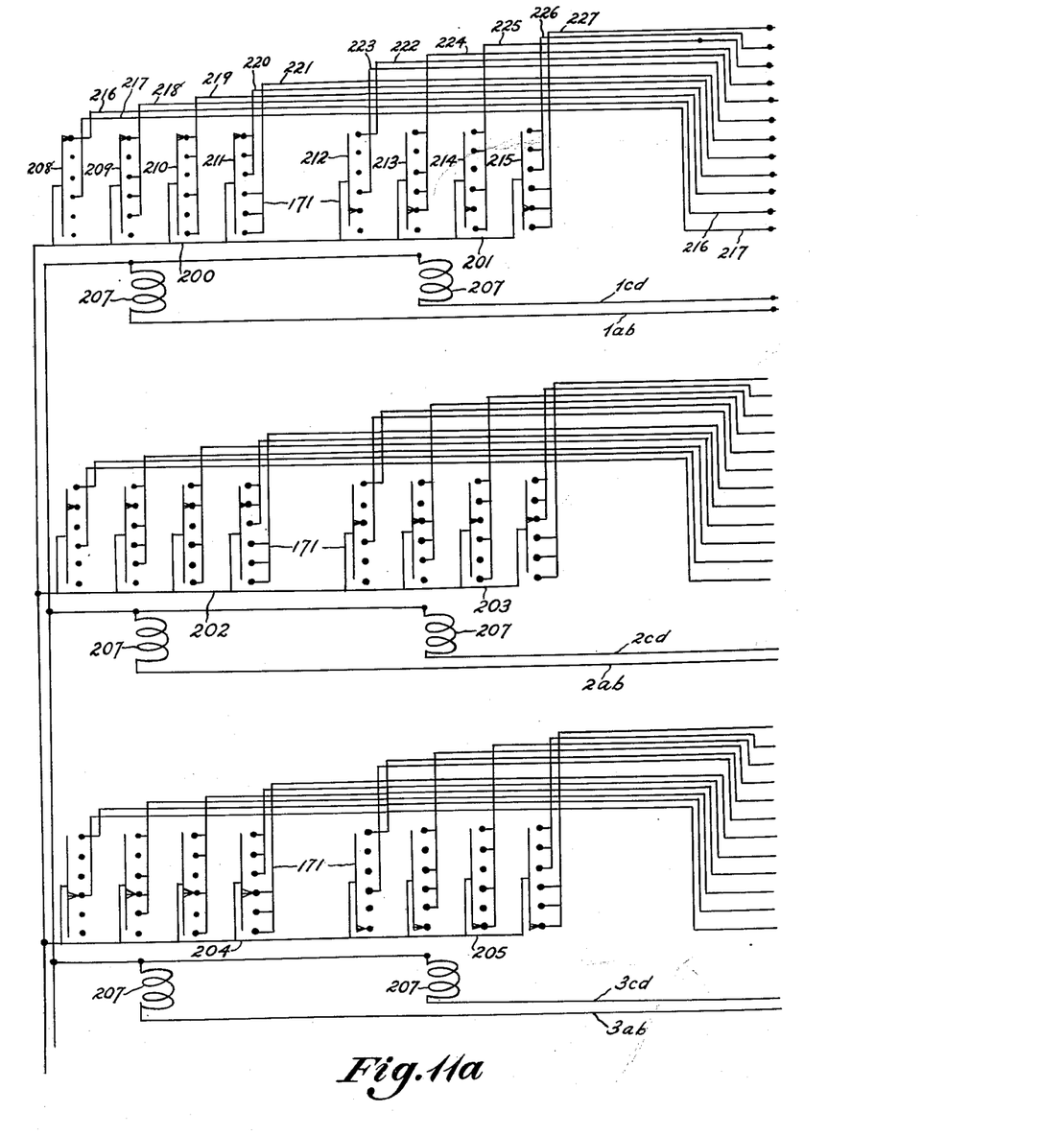
FIGURES 11a, 11b, 11c, 11d, 11e, 11f, and 12 are schematic diagrams of the electrical control means which comprises a part of the embodiment.
Figure 11B:
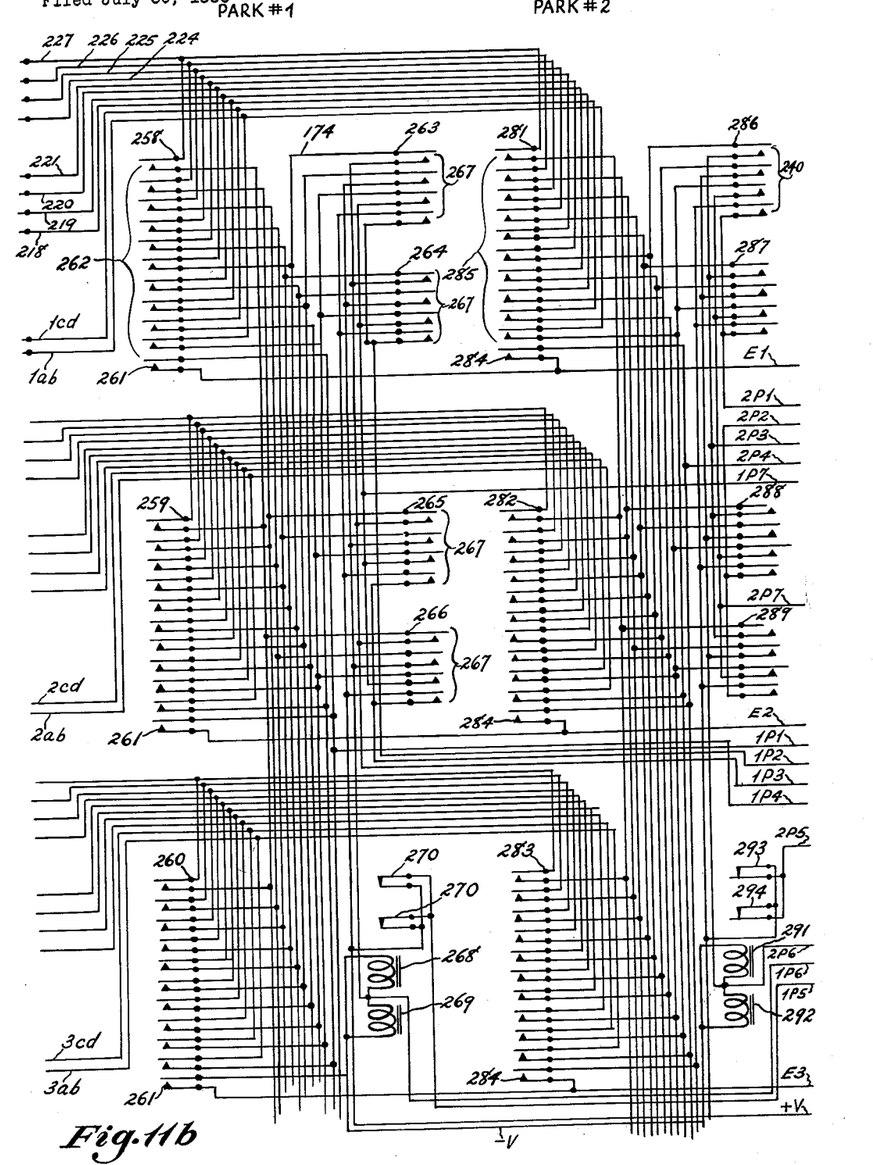
Figure 11C:
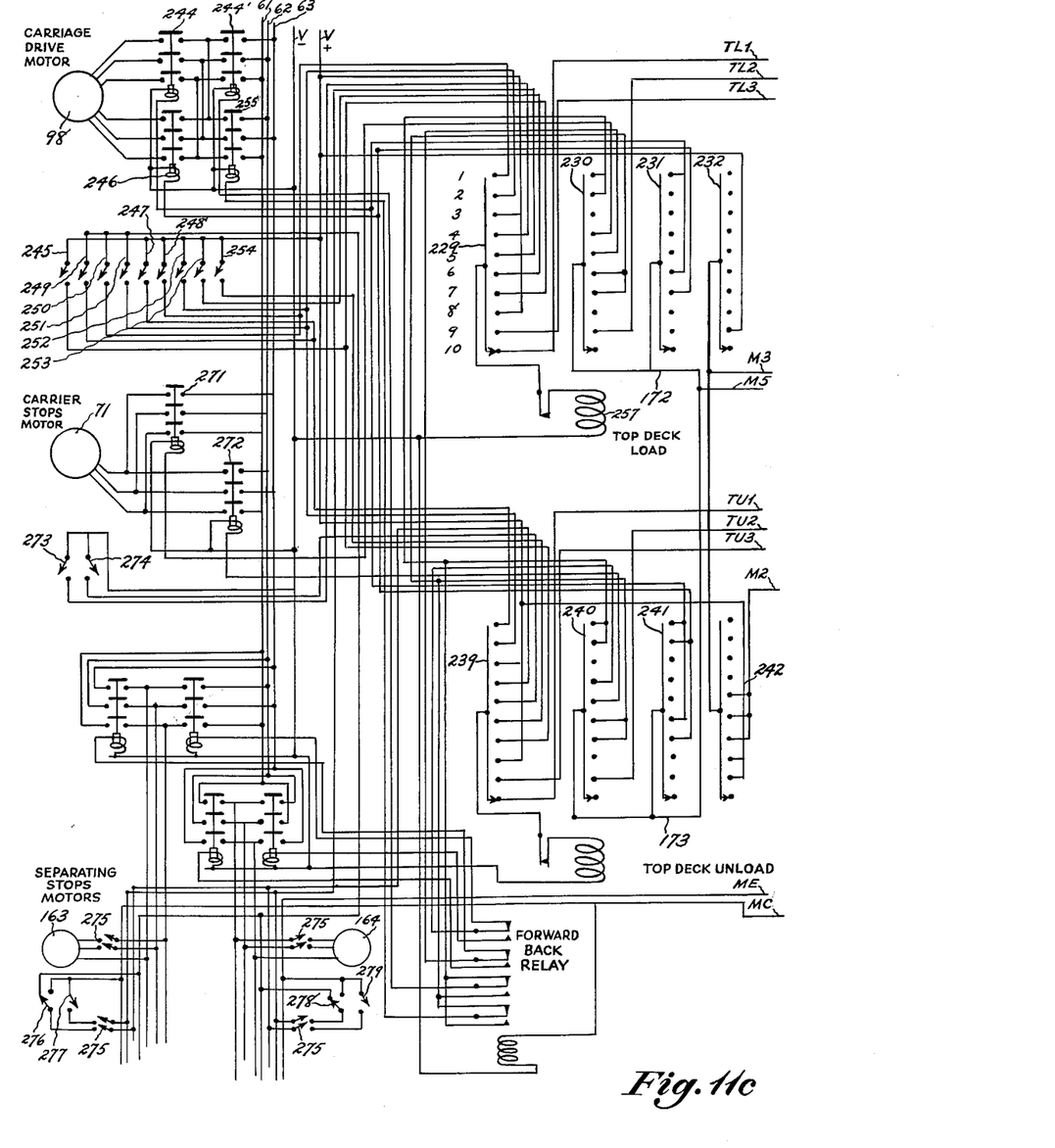
Figure 11D:
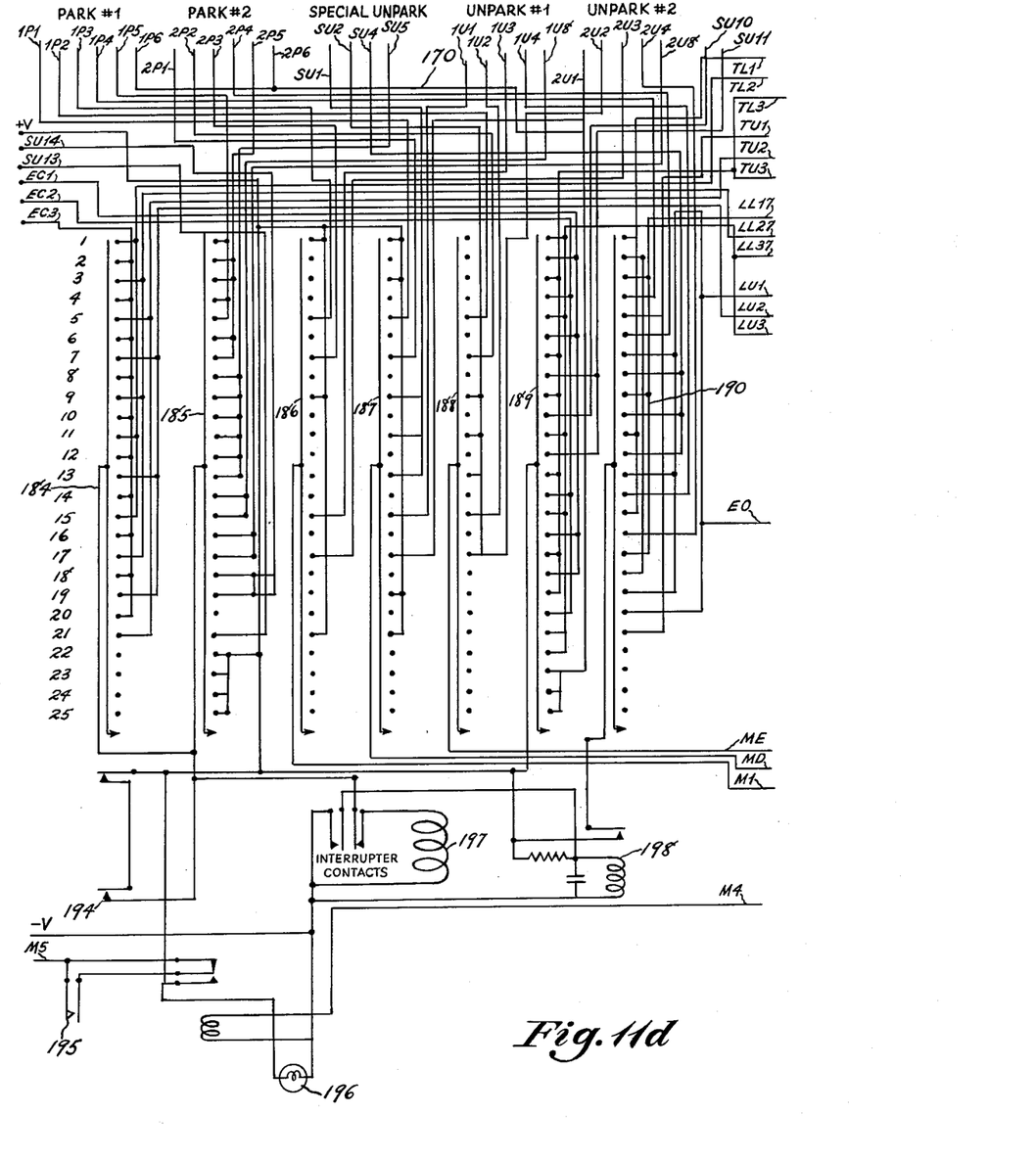
Figure 11E:
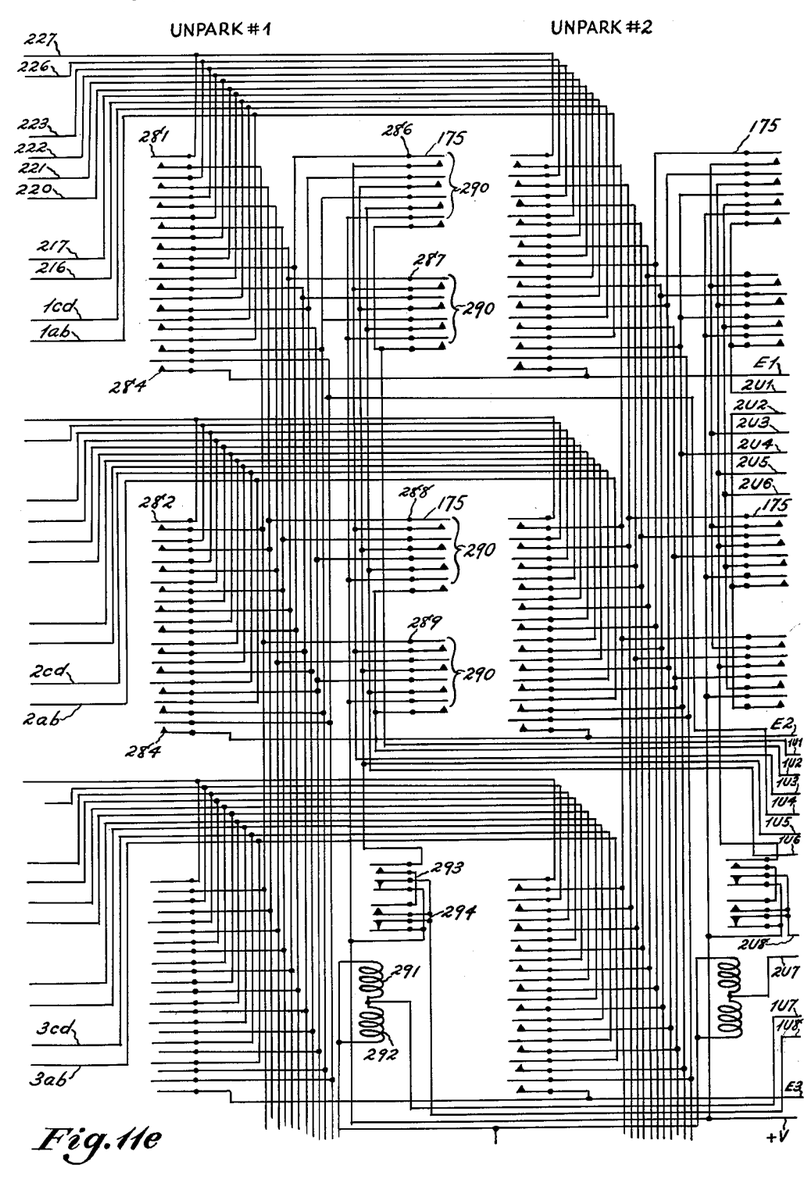
Figures 11F, 12:
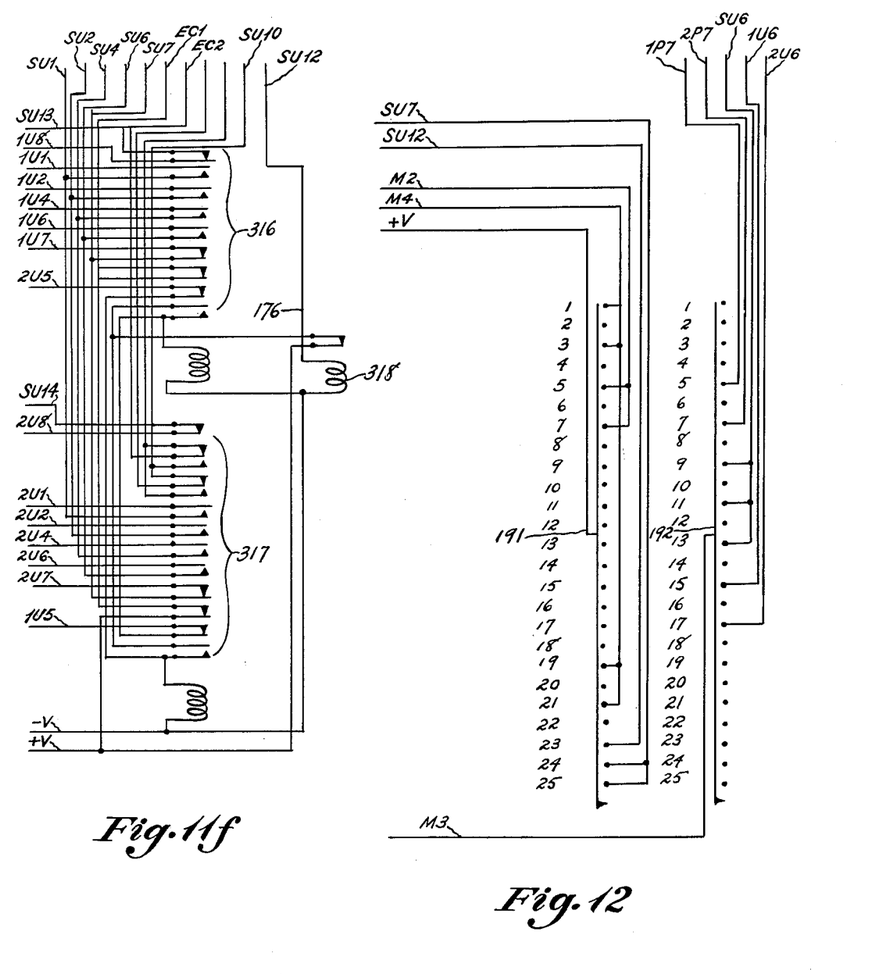

The device embodying the invention comprises broadly a building or structural element 20, mechanical means 22 for moving vehicles within said building, and control means schematically illustrated on FIGURES 11 to 12, inclusive.

Figure 1:
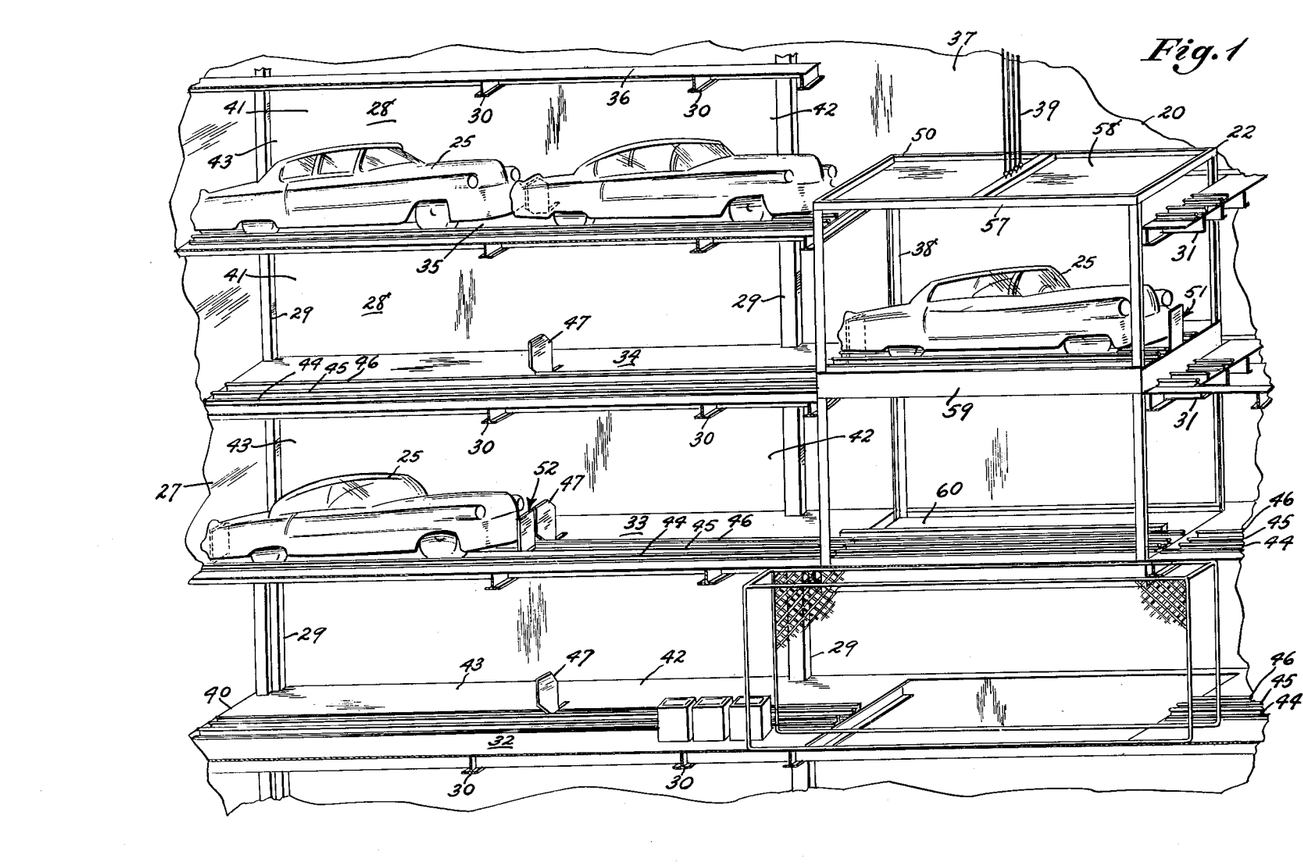
FIGURE 1 is a fragmentary view in perspective showing a parking garage constructed in accordance with the invention.
Figure 2:
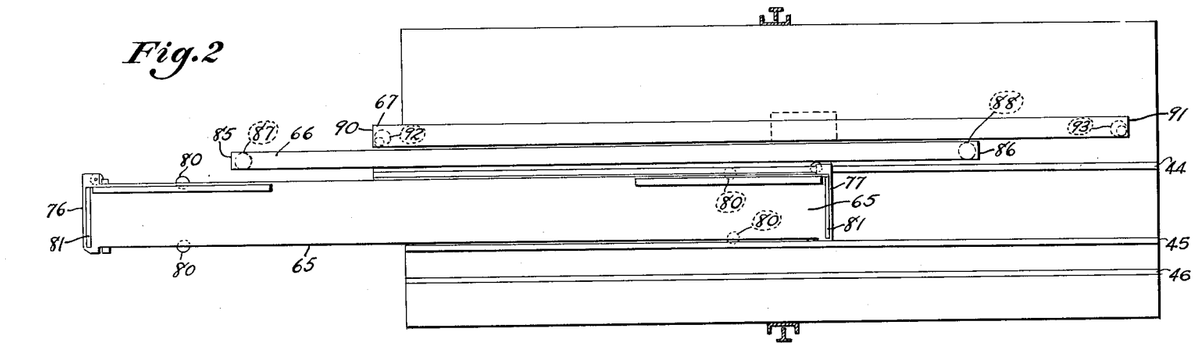
FIGURE 2 is a plan view of a single elevator deck which comprises a part of an embodiment of the invention.

The building or structure 20 is shown on FIGURE 1 of the drawing, and includes a front wall 27, side walls 28, rear walls (not shown) as well as conventional roof structure (also not shown). The construction of the building 20 may be skeletonized, if desired, eliminating the above mentioned walls, although the minimum farme work includes a plurality of horizontal beams 30, joists 31, a ground floor 32, and a plurality of upper floors 33, 34, 35 and 36. The elevator shaftway 37 is located substantially midway with respect to the depth of the building as measured from the front to the rear walls thereof, and a twin deck elevator car 38 is supported within the shaftway by cables 39 in a manner well known in the art. The front entrance 40 is located at grade line, or may be provided with a ramp (not shown) to facilitate the driving of automobiles from the street therethrough. Where the building is so situated that the building extends on two sides to a street, a second exit opposite the enrance 40 may be provided, or the building may be closed at this end for additional parking space.

As has been mentioned, the building is divided into modules approximately 10 ft. wide and 100 ft. deep so that each of the floors 33–36 provides a plurality of stalls 41 forwardly and rearwardly of the elevator shaftway 37. These stalls are approximately 40 ft. long and 10 ft. wide, thus forming a near area 42 disposed adjacent the elevator shaftway and a far area 43 disposed between the near area 42 and an outside wall. Each of the areas 42—43 is capable of accommodating a single passenger car 25. Extending along the surface of each of the floors 32—36 are first, second and third rails 44, 45 and 46, respectively, the rails extending to the edge of the elevator shaftway so as to align with similar rails disposed upon the decks of the elevator car 50.

The mechanical means 22 is installed in the building 20 preferably at the time of the construction of the former. It includes the elevator car 50, an upper carriage element 51 situated on the upper deck 59 of the car 50, and a lower carriage element 52 situated on the lower deck 60 of the car 50, when not in use.

The elevator car 50 includes a cage element 57 having a roof member 58 and the above mentioned upper and lower decks 59 and 60.

The upper and lower carriage elements 51 and 52 are substantially similar, and accordingly, a detailed description of the upper carriage element 51 will serve equally well to describe the lower carriage element 52, thereby avoiding needless repetition.

Figure 4:
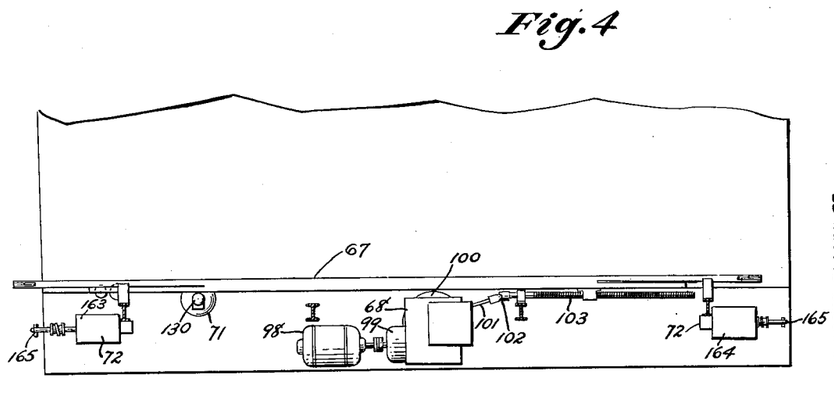
FIGURE 4 is a side elevational view of the single elevator deck, corresponding to that seen from the plane 4—4 on FIGURE 3.

Referring to FIGURES 2 and 5 to 10, inclusive, the carriage element 51 includes a main carrier member 65, a first carrier strut 66, and a second carrier strut 67. The members 65–67 are normally disposed upon the deck 59 of the elevator car 50, and are moved outwardly upon the floors 32–36 as shown on FIGURE 1 by a carrier drive means 68 (FIGURE 4). Carrier stop means 69 and snubbing strap means 70 are movably mounted upon the main carrier member 65 for engaging a vehicle 25 when the main carrier member is disposed beneath the same. The means 69 and 70 are driven by carrier stop drive means 71.

The main carrier member 65 is of elongated configuration and preferably formed from welded steel construction. It includes a leftward end 76, a rightward end 77, track engaging means 78 and 79, and guide rollers 80. Slots 81 provide means for the egress of the carrier stop means 69. Separating stop drive means 72 is provided at each end of the elevator deck to erect and lower the separating stops 47 which form a part of the building floors.

The first carrier strut 66 includes a leftward end 85 and a rightward end 86, each end of which is provided with multiple pulleys 87 and 88, respectively. The second carrier strut 67 includes a leftward end 90 and a rightward end 91, the ends being provided with multiple pulleys 92 and 93, respectively.

The carrier drive means 68 serves to extend the carriage element 51 to either side of the elevator and includes an electric brake motor 98 of approximately 10 H.P., gear reduction means 99, a cable drive drum 100, a power take-off 101, universal joint means 102 and a worm drive 103 transmitting motion to the second carrier strut 67. Fixed to the drum 100 are leftward and rightward drive cables 104 and 105, respectively, (see FIGURES 7 and 8). Motion control cables 106 and 107 (see FIGURE 9), are anchored to the ends of carrier member 65 and second carrier strut 67.

Figures 14, 15:
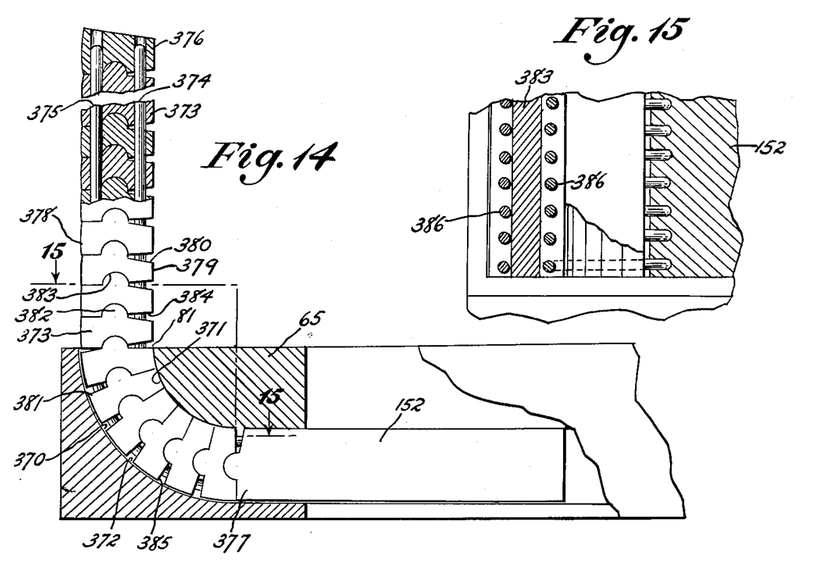
FIGURE 14 is a vertical sectional view showing details of the carrier stop means which comprises a part of the embodiment.
FIGURE 15 is a sectional view corresponding to that seen from the planes 15—15 on FIGURE 14.

Referring to FIGURES 14 and 15, the operation of the carrier stop means 69 may be understood from a consideration of the component parts thereof. The same is partially disposed within a channel 370 in the main carrier member 65. The channel is bounded by an upper convex surface 371 and a lower concave surface 372, which are spaced apart a distance just sufficient to clear a plurality of link members 373. The link members are held in position for relatively limited mutual pivotal movement by a first set of cables 374 and a second set of cables 375. The link members are substantially similar with the exception of the uppermost link member 376 and lowermost link member 377. Each includes an outer curved surface 378, an inner curved surface 379, an upper inwardly disposed surface 380, an upper outwardly disposed surface 381, an upper arcuate projection 382, a lower arcuate recess 383, a lower inwardly disposed surface 384 and a lower outwardly disposed surface 385. The purpose of moving strut 67 by screw drive 103 is to permit the base from which the strut 66 commences operation to be shifted outwardly from the elevator floor to make it possible to move a car two full car lengths from the elevator while still using only two extendable struts. While the outer surfaces 381 and 385 are substantially parallel, the inner surfaces 380 and 384 are disposed in converging relationship to permit a degree of pivoting when the same are disposed within the channel 370. The cables 374 and 375 are disposed in slideable relationship within bores 386 in the link members 373, and are postively anchored in the uppermost link member 376 and lowermost link member 377. The lowermost link member 377 is preferably formed integrally with the erector bar 152.

From a consideration of the above, it is apparent that the movement permitted by the cables 374 and 375 is limited to a curved relationship of the link members 373 disposed within the channel 370. Those link members which are disposed outwardly of the channel 370 are held in rectilinear disposition by the tension of the cables 374 and 375 which are of insufficient length to permit flexure. In addtion, the stress exerted by a vehicle contacting the same is countered by the compression forces exerted by the contact of the outer, upper and lower surfaces 381 and 385 of each link member with adjoining link members.

The purpose of equalizing cables 106 and 107 is to establish a fixed relation between the struts while the same are being extended, that is to say the strut 66 is maintained halfway between members 67 and 65 at all times irrespective of the position of other elements. This permits the strut 66 to be returned to the elevator completely prior to moving the elevator to another floor.

Figure 3:
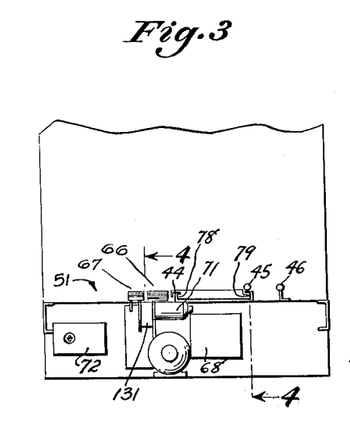
FIGURE 3 is a fragmentary end view in elevation of the deck as seen from the lefthand portion of FIGURE 2.

The means 71 includes a torsion motor 130 (see FIGURES 3 and 4), a drive drum 131 (see FIGURE 10), a first drive cable, 132, and a second drive cable 133. The cables 132—133 are looped about pulleys 92, 93, 87, and 88 (also seen on FIGURE 2) and the pulleys 134 and 135 on the main carrier member 65. The pulleys 92, 93, 87 and 88 are multiple sheave pulleys.

Figure 5:
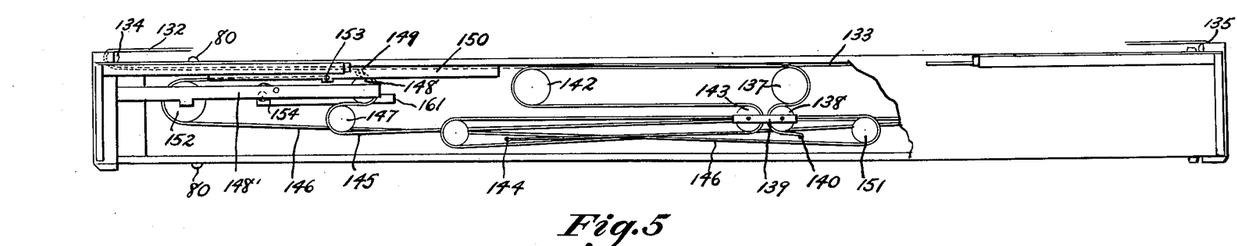
FIGURE 5 is an enlarged fragmentary plan view showing cable means for actuating carrier stop means and snubbing strap means which comprise a part of the embodiment.
Figure 6:
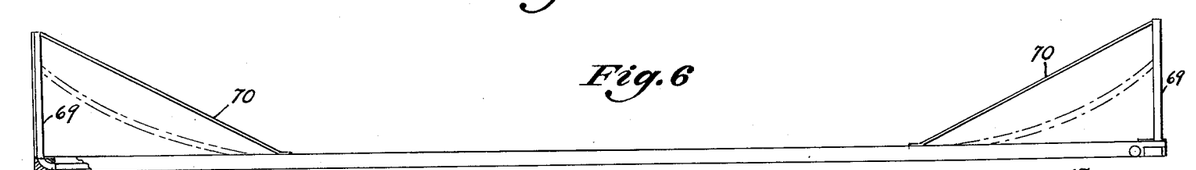
FIGURE 6 is a side elevational view showing the above mentioned carrier stop means and snubbing strap means in erected condition, and corresponding to the position of the cables shown on FIGURE 5.
Figure 7:
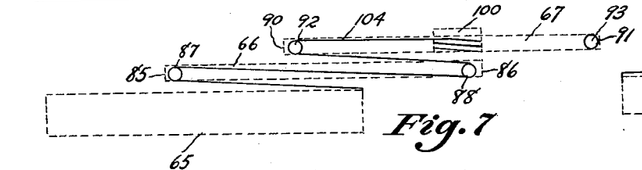
FIGURE 7 is a schematic view showing a portion of the cable drive means employed for moving a carriage element outwardly of an elevator deck.
Figure 8:
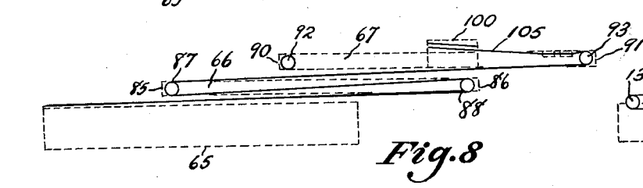
FIGURE 8 is a similar schematic view showing cable means for moving the carriage element in an opposite direction.
Figure 9:
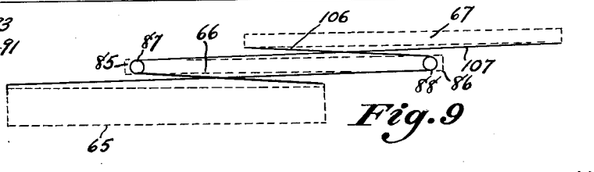
FIGURE 9 is a schematic view showing cable means for determining the relative position of the component parts of the carriage element.
Figure 16:
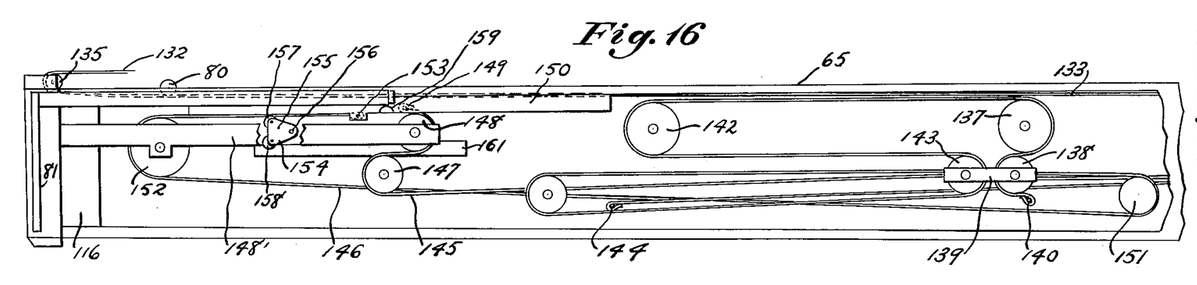
FIGURE 16 is a fragmentary plan view of the means for raising and lowering the carrier stop means, corresponding to that seen on FIGURE 5, but enlarged to show greater detail.
Figure 17:
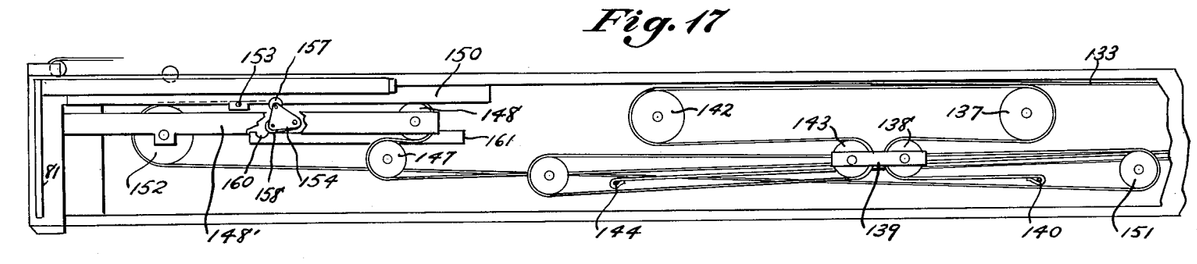
FIGURE 17 is a similar view showing the operation of a sequence lock during the lowering of the carrier stop means.
Figure 18:
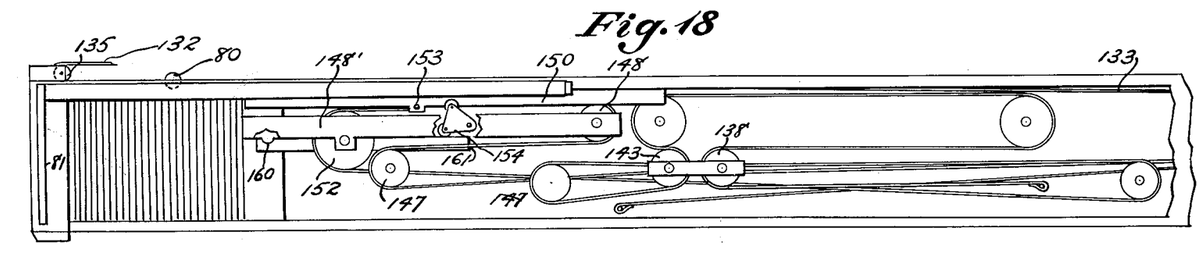
FIGURE 18 is a similar view showing the carrier stop means in fully lowered position.

Referring to FIGURE 5, the cable 132 is looped about a pulley 137 which is fixed for rotation upon the main carrier member 65, thence about a pulley 138 on a movable block 139 to be anchored at point 140 on the main carrier member. The cable 133 is looped in a similar manner about the pulleys 142 and 143 to be anchored at the point 144. The block 139 mounts a pair of cables 145 and 146 which serve to raise and lower the carrier stop means on the lefthand side of the carriage element, and a similar set of cables is provided for raising and lowering the carrier stop means (not shown) at the righthand end of the main carrier member. The cable 145 is looped about a fixed pulley 147 and thence about the pulley 148 which is mounted upon the carrier stop erector bar 148′, to be anchored at point 149 on the snubbing strap slide 150. The cable 146 is looped about the pulley 151 and the larger pulley 152 on the erector bar 148′ to be anchored at point 153 on the snubbing strap slide 150. A sequence lock 154 (see FIGURE 16–18) includes a support portion 155 mounted for pivotal rotation at point 156 on the erector bar 148′. The portion 155 mounts an upper roller member 157 and a lower roller member 158, the former being engageable in a notch 159 in the snubbing strap slide and the latter in a notch 160 in a member 161 fixedly mounted on the main carrier member.

The separating stop drive means 72 is best seen on FIGURE 4, the same including a lefthand motor 163 and a righthand motor 164. Each of the motors provided is with an engagement member 165 which engages a long shaft (not shown) disposed in the floor, which in turn raises and lowers the fixed separating stops 47 disposed on each floor. If desired, separate motors may be employed for raising and lowering each stop 47, in which case the drive motors 163 and 164 are eliminated.

At this point in the disclosure, the operation of the means 22 may be summarized as follows. Assume a vehicle 25 to be disposed in a far area 43 of a stall 41 (see FIGURE 1), and the carriage element 51 to be disposed upon the deck 59. After aligning the deck with the proper floor, the carriage element 51 is moved from the deck to a position beneath the vehicle 25 by energizing the motor 98. Motion is transmitted through the worm drive means 103 and simultaneously through the cable 104 by the drum 100. The second carrier strut 67 will move a given distance as determined by the worm drive 103. Due to the interconnection of the cables 106 and 107, motion imparted by the rotation of the drum through the cable 104 is such that movement of the carrier member with respect to the second carrier strut will be exactly twice the movement of the first carrier strut with respect to the second carrier strut. As the movement of the main carrier member 65 is constrained by engagement of the same with the rails 44 and 45, this motion extends in a straight line onto the floor of the garage. Depending upon the position of the vehicle 25, the main carrier member 65 may move a distance as much as two vehicle lengths from the elevator decks.

Movement of the carriage element is governed by the location of electrical switches (not shown) operated by rotation of the drive drum 100, since movement of the drum is proportional to movement of the carriage element.

Figure 10:
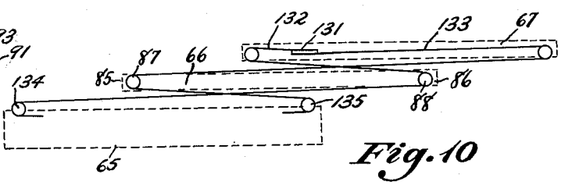
FIGURE 10 is a schematic view showing motion transmitting means associated with that shown on FIGURE 5.

Upon being positioned beneath the vehicle 25, the main carrier member 65 slows to a stop, following which the carrier stop and snubbing strap drive means is actuated. Referring to FIGURES 5 and 10, the drum 131 is rotated causing tension to be exerted upon cable 132 which is transmitted to cause rightward movement of the pulley block 139. Tension is transmitted to the cable 145 to result in movement of the erector bar 148′ leftwardly as seen on FIGURE 5 inturn resulting in the erection of the carrier stops 69 on either end of the main carrier member. When the transfer point of the sequence lock 154 is reached, the snubbing strap slide 150 is moved rightwardly resulting in tightening the snubbing strap means 70 from the limp position indicated by the dash lines on FIGURE 6 to the erect position shown in full lines. The snubbing strap means thus engages a portion of the front and rear bumpers of the vehicle. The snubbing strap 70 engages a portion of the bumpers by virtue of the fact that it lies within the side boundaries of the car. The strap 70 is fixed at the upper end to the barrier and is held in an upward position at one end as the barrier is erected. When the other end of the snubbing strap is tensed, it assumes an angle with respect to the horizontal until it contacts a portion of the bumper. At this point, the lefthand motor 163 or righthand motor 164 which comprise the separating stop drive means 72 is actuated, causing the engagement member 165 of either to be extended to engage means (not shown) for lowering the separating stop disposed in front of the vehicle being moved. The carriage element is then returned to the deck of the elevator by reversing the motor 98, motion being transmitted through the snubbing straps to cause the vehicle to move with the main carrier member 65. Upon reaching the deck, the carriage element is halted, and after disengagement of the member 165 the elevator 50 moves such that the deck is positioned opposite the floor upon which the vehicle is to be disposed. The unloading of the elevator deck is accomplished in a similar manner, the process including the steps of moving the main carrier member 65 together with the vehicle 25 to the far stall of the selected floor, the engagement of the member 165 with the proper separating stop, the raising of the separating stop, the lowering of the carrier stop and snubbing strap means, and the return of the carriage element to the elevator deck. Where movement is to the near areas of the stalls, the separating stop is not moved, as the vehicle does not pass the point where the same is located. As the carrier stop means and separating stop are located on opposite sides of the center line of the vehicle, it is possible for either or both to be positioned to engage the vehicle. Thus after the main carrier member has been disengaged the location of the vehicle with respect to the separating stop is known, being on either side of the same.

The control means for accomplishing the foregoing operation in an automatic manner, is schematically illustrated on FIGURES 11 to 12 inclusive. Broadly speaking, the control is accomplished by means of stepping relays each of which controls specific functions.

The control means comprises generally: a master cycle stepper element 170 (see FIGURES 11d and 12); a plurality of memory circuit stepper elements 171 (see FIGURE 11a); a pair of deck loading stepper elements, one of which is indicated by reference character 172 on FIGURE 11c; a pair of deck unloading stepper elements, one of which is indicated by reference character 173 on FIGURE 11c; a plurality of parking circuits 174 (see FIGURE 11b) a plurality of unparking circuits 175 (FIGURE 11e) and special unparking relay circuits 176 (see FIGURE 11f).

The master cycle stepper element 170 includes 9 decks, which for purposes of convenience in illustration are shown on FIGURES 11d and 12. At the present time cycle steppers are commercially available having 10 decks and 25 positions for each deck, which steppers are suitable for use in the instant application. The decks include a first or commutator deck 184; a second or skip deck 185; a third deck 186 employed where near stall areas are involved; a fourth deck 187 employed for movement in stalls which are forwardly disposed in respect to the elevator shaft; a fifth deck 188 employed for movement in stalls disposed rearwardly of the elevator shaft; a sixth deck 189, which determines movement of carriage element either on the upper or lower decks of the elevator car; a seventh deck 190 which may be referred to as the operations deck, as will appear more clearly hereinafter; an eighth deck (see FIGURE 12) 191 which serves to step the memory circuit stepper elements 171; and a ninth deck 192 which determines which particular memory circuit is to be stepped.

The master cycle stepper element 170 will pass through all of the 25 positions during the course of a single cycle of operations, that is to say, for example, movement of the elevator from a position on the ground floor through the cycle of loading cars to be parked, parking them at the designated stalls, picking up vehicles which are to be made ready, and returning them to the ground floor. The function or operation which takes place during each of the 25 positions is as follows.

(1) Load near car disposed in near area 42 on the ground floor (see FIGURE 1) which is forward of the elevator shaft onto the upper deck 59 using the upper carriage element 51, the destination as pre-selected by the operator.

(2) Bring lower deck 60 to ground floor (this step is skipped if only one car is to be parked).

(3) Load far car disposed in far area 43 on the ground floor disposed forwardly of the elevator shaft on lower deck 60 using lower carriage element 52 (this step is skipped where only one car is being parked).

(4) Move elevator car to floor selected for parking the first car, that is to say, the top deck is aligned with the first selected floor.

(5) Unload upper deck 59 to selected stall as described hereinabove.

(6) Move elevator to align lower deck 60 with floor selected for parking second vehicle (skip if only one vehicle being parked).

(7) Unload lower deck. (Skip if only one car being parked.)

(8) Move elevator for special unpark. (This operation takes place where the vehicle desired is in a far area, and it is necessary to remove the vehicle in the near area of the stall prior to removing the car desired, and to replace the car formerly in the near area into the far area formerly occupied by the vehicle desired. The desired vehicle may be loaded on the upper or lower deck as predetermined by the operator, and will be more fully discussed under a description of the special unparking circuits 176. This step and all succeeding positions to position 14 are skipped if there is no special unpark involved.)

(9) Load near vehicle on upper or lower deck as predetermined.

(10) Move elevator to align other deck with floor.

(11) Load desired vehicle from far stall on empty deck, upper or lower deck as pre-selected.

(12) Move elevator to align deck upon which first vehicle is placed.

(13) Unload deck to far area of stall.

(14) Move elevator with desired car for floor upon which second car desired is disposed (this step is skipped if only special unparked car is desired, and is a continuation of step 7 in the event that there is no special unpark operation). Only one special unpark operation is performed per cycle.

(15) Load upper deck (this deck will normally be loaded first). (This step is skipped in special unpark operation.)

(16) Move elevator to position lower deck for second vehicle desired (this step is skipped if the second vehicle desired is a special unpark situation or if only one car is desired).

(17) Load lower deck (this step is skipped along with step 16 under same conditions).

(18) Move elevator to bring lower deck to ground floor (skip if no second vehicle desired or if second vehicle desired is a special unpark situation and has not been performed).

(19) Unload lower deck to far position on ground floor (skip along with step 18 under same circumstances).

(20) Move upper deck to ground floor.

(21) Unload upper deck to near position on ground floor (skip if no car on upper deck or if car selected for upper deck is special unpark, but special unpark relay has not been tripped).

(22—25) Reset master cycle stepper to zero position.

(23) Energize release relay which breaks hold circuit for special unpark relays if both cars desired have been special unpark situations, the one which has not been performed will now trip its own special unpark relay, as will more fully appear hereinafter.

(24—25) Push buttons of unpark circuits released.

The above described cycle stepper element 170 is started through a cycle by the pressing of a manually controlled cycle start button 194. However, no operations on the ground floor will be performed unless the safety button 195 is manually and continually pressed during such operations, in order that the operations may be interrupted in the event that any obstructions or persons are in the path of the moving vehicles. During this time, a signal lamp 196 will be illuminated advising the operator of the necessity of pressing the button 195 and maintaining pressure upon the same until ground floor operations are completed. The master cycle stepper element is advanced by the stepping armature 197 of well known type, and a slow operation relay 198 is wired into the circuit as shown to prevent the starting of any of the above described operations during the short period the particular circuit is closed while skipping one or more positions.

The memory circuit stepper elements 171 include steppers of four deck six position type, two being required for each floor. To avoid needless repetition, the circuits of the first three storage floors are illustrated, it being understood that circuits for the remaining storage floors are similar. The steppers include a first floor front stepper element 200, a first floor rear stepper element 201, a second floor front stepper element 202, a second floor rear stepper element 203, a third floor front stepper element 204 and a third floor rear stepper element 205. As many other front and rear stepper elements may be provided in similar manner as there are storage floors. It is to be understood that the ground floor requires no memory circuit, as this floor is employed for the discharge and loading of cars coming in from street level. Where possible and desirable, several of the storage floors may be below street level, so that the designations first floor, second floor, etc. are merely for purposes of convenience, and may be located at any desired level.

In any given stall 41 each having a near area 42 and far area 43 there are six conditions which must be accounted for by the memory circuit. As the cars are parked by two separate decks of the elevator, the parking by either deck will be designated as "Park #1" for the upper deck or "Park #2" for the lower deck, the assigned initial position on any given floor running from the far stall forward to the far stall rearward will be designated A, B, C, or D. Thus, to park the near vehicle on the ground floor area, the operator may press, for example, buttons on the "Park #1" section of the control panel 300 (FIGURE 13) numbered 3 and A. To park a second car at the same time he may press buttons on the "Park #2" section of the control panel numbered 3B. Upon pressing the cycle start button 194 as described hereinabove, the vehicles will be parked in the respective stalls on the third floor. During the course of continued operation, the vehicle parked under "Park #1" may be required and due to the special unpark situation involved the second vehicle previously in the near area designated 3B will be moved to the far area designated 3A and previously occupied by the first vehicle. A subsequent vehicle which will be designated 3A may later be placed in that originally occupied by the second car. Thus the situations of which there are six possibilities may be desribed as follows: The first situation is where vehicle A is in the near area and both areas are occupied. The second situation is where B is in the far area and A is unoccupied. The third situation is where both A and B are unoccupied and therefore available, for parking. The fourth situation is where both A and B are occupied and the B vehicle is in the near area. The fifth situation is where A is in the far area and B is available. The sixth situation is where B is in the far area and A in the near area and both stalls are available. Physically the sixth situation resembles the third and is employed to simplify circuitry which is such that the far area will always be taken for parking if available. These six positions correspond to the six positions shown on each of the memory cycle steppers 171. Referring to the element 200 in the upper lefthand portion of FIGURE 11a, the first deck 208 is provided with circuits 216 and 217 to indicate special unpark situations. It will be observed that these circuits are closed only in the first and fourth conditions at which time both areas of the stall are occupied.

The second deck 209 closes a circuit in the first, third, fourth and fifth positions, the circuit 218 providing for those situations where A as represented by the push button on the control panel is not available for parking.

The third deck 210 closes a circuit on the first, second, fourth and sixth positions as representing where B is not available for parking. This circuit is indicated by reference character 219.

The fourth deck 211 closes circuit 220 in the first three positions where the near vehicle is designated A, and a second circuit 221 in the fourth, fifth and sixth positions, where the near vehicle is designated B. Stepper 201 performs a similar function for the near and far positions of the stall located rearwardly of the elevator shaft deck 212 closing circuits 222 and 223 for C and D special unpark, deck 213 closing circuit 224 where C is not available, deck 214 closing circuit 225 where D is not available and deck 215 closes circuit 226 and 227 where C is near and D is near, respectively. The memory circuit stepper elements 171 are advanced by solenoids 207 in well known manner.

The elevator deck loading stepper elements 172 are two in number, one for each deck although only the element serving the upper deck is illustrated on the drawing (FIGURE 11c), thereby avoiding needless repetition, the element serving the lower deck being substantially identical.

The element 172 comprises four decks, including a first deck 229 which serves as a commutator deck, a second or near position deck 230, a third deck 231 which determines forward or rearward movement, and a fourth deck 232 operative only in the last position which steps a memory cycle stepper element 171 at the completion of a loading operation. Each of the decks includes 10 positions, the functions of each position being as follows:

(1) Carrier out at high speed. The high speed relay 244 and forward relay 244 is energized causing motor 98 to rotate drum 100 as described hereinabove.

(2) Carrier out low speed. When the carrier is almost at its outermost position (near or far) the carrier position switch 245 is contacted causing the low speed relay 246 to be energized, connecting the low speed winding, preparatory to stopping at the required position.

(3) Stop. A second carrier position switch 247 is contacted causing both low speed and high speed relays to be de-energized and the brake to immediately arrest the movement of the carriage element.

(4) Carrier stops up. At this point, the vehicle is engaged by the carrier stop and snubbing strap means, as described, preparatory to moving the vehicle onto the deck of the elevator car.

(5) Separating stop down. This step is skipped if the vehicle being engaged is in the near area since the separating stop will then be on the far side of the vehicle. Where the vehicle is in the far area, it is necessary that the separating stop be lowered before the vehicle may be moved toward the elevator car.

(6) Carrier in at high speed. The carriage element starts toward the elevator car using the high speed relay 244 and relay 255 for motion of the drum 100 in a reverse direction.

(7) Carrier in at low speed.

(8) Stop. Here the carriage element has arrived upon its deck of the elevator car and has come to a full stop.

During each of the above described steps a separate position switch has been closed causing the element 172 to be advanced to the next position by the solenoid stepper 257. At the ninth position, the connection at position 9 on deck 230 advances the master cycle stepper element 170 for subsequent operations.

It will be observed that there are nine carrier position switches, 245, 247, 248, 249, 251, 250, 252, 253 and 254; all of which are preferably driven by the drum 100 to acommocdate the functions for near and far positions and high and low speeds. The carrier stop and snubbing strap drive means 71 is provided with a single relay 271 for raising the same and a second relay 272 for lowering the same. Limit switches 273 and 274 determine the completion of a raising or lowering operation.

The separating stops motors 163 and 164 are provided with contact switches 275 which prevent the motors from operating until a deck of the elevator is accurately aligned with a given floor and limit switches 276, 277, 278 and 279 for determining the completion of raising or lowering operations.

The elevator deck unloading elements 173 are two in number, although only one is shown in FIGURE 11c, and correspond to the loading elements 172. The four decks 239, 240, 241 and 242 correspond to the decks 229, 230, 231 and 232. The only difference in function is that these decks operate to move a car outwardly from the elevator car to the floor. The same high and low speed relays and reversing relays are employed to operate the same motors.

Figure 13:
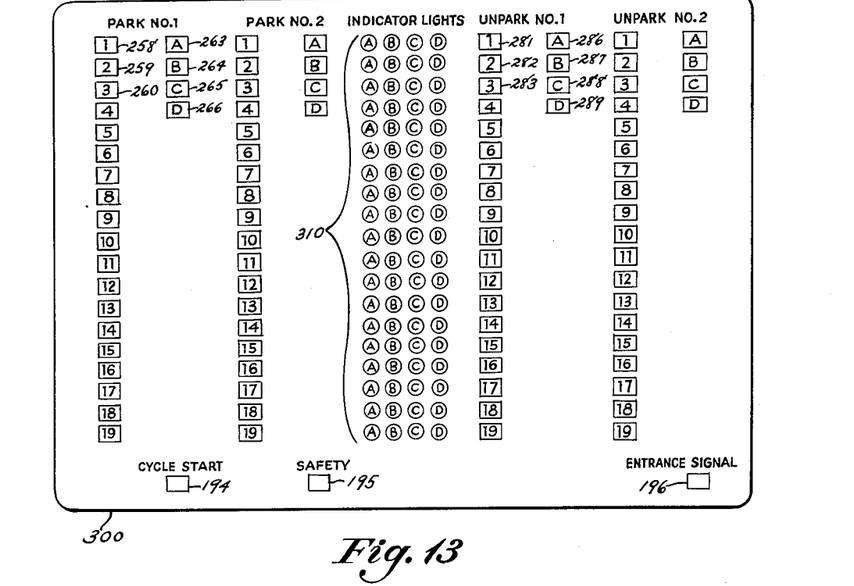
FIGURE 13 is a front elevational view showing a control panel from which the embodiment is operated by a single operator.

The parking circuits 174 of which there is one for each elevator deck are controlled from the control panel 300, shown on FIGURE 13. The panel includes a plurality of floor buttons, one for each floor indicated by reference character 258, and four position buttons 263, 264, 265 and 266 designated, respectively, A, B, C, and D. Above the above mentioned buttons is the designation "Park #1," indicating that these buttons serve to park a vehicle disposed in the near position or area on the first floor using the carriage element disposed on the upper deck of the elevator car.

Referring to FIGURE 11b, there are shown the electrical connections for the floor buttons for the first three vehicle storage floors, as indicated by reference characters 258, 259 and 260. Buttons for the other floors are substantially similar, the number depending upon the number of parking floors in the building. Associated with each floor button is an elevator control switch 261 which provides a signal as in conventional self-service elevators. As the construciton and operation of such elevators is well known in the art, it will not be considered at length in this disclosure. The remaining switches 262 are interconnected with the memory circuits relating to the same floors, as will be evident by a simultaneous consideration of 11a and 11b. It is to be noted at this point that decks 208 and 212 are not connected to the park buttons as the function of the same relates to the special unpark circuits to be subsequently described.

The position buttons 263–266 are provided with contacts 267 which also connect with the memory circuits. Refering to the lower portion of FIGURE 11b, there will be observed the push button release solenoids 268 and 269 which return the buttons on the control board to normal position when a car has been parked, as well as contacts 270 which are normally closed to provide skipping voltages where there is no parking selection on "Park #1."

On the righthand portion of FIGURE 11b there is shown a similar diagram providing for parking selections under "Park #2." This differs from the circuit described hereinabove only in that it controls the carriage element on the lower deck of the elevator car and is adapted to pick up and return vehicles to the far position on the ground floor.

The indicator lights 310 (FIGURE 13) are wired to switches (not shown) within the individual areas of the parking stalls in such manner as to be illuminated when the areas corresponding thereto are available. If desired they may also be wired into the memory circuits, but it is preferable to have a positive check on the availability of the spaces in the event of failure of the memory circuits.

The unparking circuits 175 (FIGURE 11e) are generally similar, one circuit relating to "Unpark #1," and the other to "Unpark #2," these circuits corresponding to the parking circuits of similar designation. The floor buttons 281, 282 and 283 relate to the first three parking floors and each is provided with an elevator control switch 284 as described above. The memory circuit connecting switches 285 are interconnected with the memory circuits relating to the same floors, as are the position buttons 286, 287, 288 and 289. The buttons 286–289 are provided with individual switches 290 which are actuated by the pressing of the buttons on the control panel. Corresponding push button release solenoids 291 and 292 are also provided as are the contacts 293 and 294 for causing skipping where there is no selection in a given cycle.

The special unpark relays 176 are shown on FIGURE 11f of the drawing, and includes a special unpark relay for "Unpark #1" indicated by reference character 316 and a special unpark relay for "Unpark #2" indicated by reference character 317, a release relay 318 controls the special unpark relays such that when a special unpark is required on "Unpark #1" and "Unpark #2," at the same time, one special unpark function will be performed for each operating cycle of the master cycle stepper element, while the buttons relating to the other will remain pressed down until the next operational cycle.

The connections of the individual contacts of the relays 316 and 317 are with decks 208 and 212 of the memory circuits and with stepper element 170. In this connection, similar reference characters on the views indicate corresponding circuits to show continuity between FIGURES 11 to 12, inclusive.

If necessary, the floors may be sloped toward the separating stop to assist in maintaining the near vehicle, or additional separating stop means (not shown) may be positioned adjacent the elevator shaftway to accomplish the same result.

I wish it to be understood that I do not consider the invention limited to the precise details of structure shown and set forth in this specification, for obvious modifications will occur to those skilled in the art to which the present invention pertains.

I claim:

1. In a parking system having a vehicle storage structure including a plurality of vehicle storage floors and an elevator having a vehicle carrying deck, improved means for transferring vehicles between said deck and said floors comprising: a plurality of tracks on said floors, a second plurality of tracks on said elevator deck alignable selectively with said tracks on said floors; a carriage element movable to and from said elevator deck and said floor upon a pair of aligned tracks; said carriage element including a main carrier member adapted to move beneath a vehicle, first and second carrier struts and cable means driven by prime mover means on said elevator deck; said cable means engaging said carrier member and strut members for moving said main carrier member onto said storage floors; said main carrier member having carrier stop means and snubbing strap means associated therewith, said carrier stop means extending vertically from the ends of said main carrier member, said snubbing strap means extending at an angle to the vertical and adapted to engage the extremities of a vehicle.

2. In a parking system having a vehicle storage structure including a plurality of vehicle storage floors and an elevator having a vehicle carrying deck, improved means for transferring vehicles between said deck and said floors comprising: a plurality of tracks on said floors, a second plurality of tracks on said elevator deck alignable selectively with said tracks on said floors; a carriage element movable to and from said elevator deck and said floor upon a pair of aligned tracks; said carriage element including a main carrier member adapted to move beneath a vehicle, first and second carrier struts and cable means driven by prime mover means on said elevator deck; said cable means engaging said carrier member and strut members for moving said main carrier member onto said storage floors; said main carrier member having carrier stop means and snubbing strap means associated therewith, said carrier stop means extending vertically from the ends of said main carrier member, said snubbing strap means extending at an angle to the vertical and adapted to engage the extremities of a vehicle; said snubbing strap means engaging said vehicle at points displaced from the longitudinal center line of said vehicle; said vehicle storage floors having separating stops thereon extendable to engage said vehicle on the opposite side of said longitudinal center line thereof.

3. A parking system comprising: a vehicle storage structure having a plurality of storage floors, each of said floors having a forward and a rearward parking stall, and an elevator shaftway disposed between said forward and rearward stall; each of said stalls having first and second areas of size sufficient to accommodate a single vehicle; said first area being disposed adjacent said elevator shaftway and said second area being disposed adjacent said first area on a side opposite said shaftway; an elevator car having at least two vehicle carrying decks thereon, and means for transferring vehicles to and from said areas to said decks; said means including: a plurality of tracks on said floors, a second plurality of tracks on said elevator decks, a carriage element upon each of said decks movable between said elevator decks and said floors upon said tracks; and automatic means for controlling the motion of said carriage element; said control means including a master cycle stepper element, a memory circuit stepper element, an elevator deck loading stepper element, an elevator deck unloading stepper element, a parking circuit and an unparking circuit whereby said elevator car may be in automatic successive steps, unpark a car disposed in a second area which is blocked by the presence of a car in a first area by moving said last mentioned car to an unoccupied area, and later unpark said last mentioned car from said last mentioned area.

4. In a parking system having a vehicle storage structure including a plurality of vehicle storage floors and an elevator having a vehicle carrying deck, improved means for transferring vehicles between said deck and said floors comprising: a plurality of tracks on said floors, a second plurality of tracks on said elevator decks alignable selectively with said tracks on said floors; a carriage element movable to and from said elevator deck and said floor upon a pair of aligned tracks; said carriage element including a main carrier member adapted to move beneath a vehicle, first and second carrier struts and cable means driven by prime mover means on said elevator deck; said cable means engaging said carrier member and strut members for moving said main carrier member onto said storage floors; said main carrier member having carrier stop means and snubbing strap means associated therewith, said carrier stop means extending vertically from the ends of said main carrier member, said snubbing strap means extending at an angle to the vertical and adapted to engage the extremities of a vehicle; and means for progressively raising said carrier stop means prior to erecting said snubbing strap means.

5. In a parking system having a vehicle storage structure including a plurality of vehicle storage floors and an elevator having a vehicle carrying deck, improved means for transferring vehicles between said deck and said floors comprising: a plurality of tracks on said floors, a second plurality of tracks on said elevator decks alignable selectively with said tracks on said floors; a carriage element movable to and from said elevator deck and said floor upon a pair of aligned tracks; said carriage element including a main carrier member adapted to move beneath a vehicle, first and second carrier struts and cable means driven by prime mover means on said elevator deck; said cable means engaging said carrier member and strut members for moving said main carrier member onto said storage floors; said main carrier member having carrier stop means associated therewith, said carrier stop means extending vertically from the ends of said main carrier member, said snubbing strap means extending at an angle to the vertical and adapted to engage the extremities of a vehicle; and sequence lock means for raising said carrier stop means prior to erecting said snubbing strap means.

6. A parking system comprising: a vehicle storage structure, having a plurality of storage floors, each of said floors having a forward and a rearward parking stall, and an elevator shaftway disposed between said forward and said rearward stalls; each of said stalls having first and second areas of size efficient to accommodate a single vehicle; said first area being disposed adjacent said elevator shaftway, and said second area being disposed adjacent said first area on a side opposite said shaftway; an elevator car having at least two vehicle-carrying decks thereon, and means for transferring vehicles to and from said areas to said decks; said means including a plurality of tracks on said floors, a second plurality of tracks on said elevator decks, a carriage element upon each of said decks, movable between said elevator decks and said floors upon said tracks; and automatic means for controlling the motion of said carriage element; said control means including a mastercycle stepper element; including a commutator deck, a skip deck, a third deck controlling said first areas of said parking stalls, a fourth deck controlling stalls on one side of said elevator shaft, a fifth deck controlling movement on the other side of said elevator shaft, a sixth deck determining movement of said carriage elements on the upper or lower decks of said elevator car, a seventh deck controlling sequence of operation, an eighth deck forming part of a memory circuit, a ninth deck selecting one of a plurality of memory circuits; said mastercycle stepper element including a plurality of positions representing successive functions which sequentially include the loading of a vehicle upon one deck of said elevator, the movement of said elevator to bring a second deck into position for loading purposes, the loading of a second vehicle, the movement of the elevator car to a floor selected for discharge for parking of the vehicle first loaded, the unloading of said vehicles to a selected stall, the movement of the elevator to align the second deck thereof with a floor selected for the parking of the second vehicle, the unloading of the second vehicle, the movement of the elevator car for unparking of a first vehicle, the loading of said first vehicle, the movement of the elevator to align a second deck thereof with the floor upon which the first vehicle was disposed, the loading of second vehicle, movement of the elevator to align the deck carrying the first vehicle, the unloading of said first vehicle, the movement of the elevator with the said second car to a floor upon which a second car is desired, the loading of such car, the movement of the elevator to a floor to pick up another vehicle, the loading of such vehicle, the movement of the elevator to bring a first deck thereof to a ground floor, the unloading of a vehicle aligned therewith, the moving of a second deck to said ground floor, the unloading of the second deck, the resetting of said mastercycle stepper to initial position.

References Cited in the file of this patent

UNITED STATES PATENTS

| | | |
|---|---|---|
| 1,676,449 | Lederer | July 10, 1928 |
| 2,051,062 | Turner et al. | Aug. 18, 1936 |
| 2,073,721 | Wheelock | Mar. 16, 1937 |
| 2,204,023 | Mason | June 11, 1940 |
| 2,229,776 | Steinhorn | Jan. 28, 1941 |
| 2,428,856 | Sinclair | Oct. 14, 1947 |
| 2,626,065 | Sanders et al. | Jan. 20, 1953 |
| 2,637,920 | Castle | May 12, 1953 |
| 2,632,530 | Wagner | Mar. 24, 1953 |
| 2,691,448 | Lontz | Oct. 12, 1954 |
| 2,741,859 | Castle | Apr. 17, 1956 |
| 2,791,338 | Thaon de Saint-Andre | May 7, 1957 |